US009268858B1

(12) United States Patent
Yacoub et al.

(10) Patent No.: US 9,268,858 B1
(45) Date of Patent: Feb. 23, 2016

(54) PREVIEWING CONTENT BASED ON DETECTED CUSTOMER ACTIVITIES

(75) Inventors: Sherif M. Yacoub, Seattle, WA (US); Dongmei Jia, Bellevue, WA (US); Bernhard Wolkerstorfer, Seattle, WA (US); Nicholas Alan Tostenrude, Bellevue, WA (US); Stephen Kang, Seattle, WA (US); Gerald J. Strode, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 141 days.

(21) Appl. No.: 13/534,699

(22) Filed: Jun. 27, 2012

(51) Int. Cl.
*G06F 17/30* (2006.01)
(52) U.S. Cl.
CPC .... *G06F 17/30867* (2013.01); *G06F 17/30525* (2013.01); *G06F 17/30554* (2013.01); *G06F 17/30648* (2013.01); *G06F 17/30699* (2013.01)
(58) Field of Classification Search
CPC ............... G06F 17/30867; G06F 17/30011; G06F 17/30029; G06F 17/3005; G06F 17/3053; G06F 17/3055; G06F 17/30696; G06F 17/30766; G06F 17/30876; G06F 17/30991; G06F 17/30905; G06F 17/30719; G06F 17/30761
USPC ........................... 705/1.1–500; 707/600–899; 715/200–867
See application file for complete search history.

(56) References Cited

U.S. PATENT DOCUMENTS

| 7,743,014 | B1 * | 6/2010 | Alexander | G06F 17/3028 |
| 8,001,143 | B1 * | 8/2011 | Gupta et al. | 707/770 |
| 8,296,422 | B2 * | 10/2012 | Rimon | 709/224 |
| 8,306,953 | B2 * | 11/2012 | Agarwala et al. | 707/688 |
| 9,098,474 | B2 * | 8/2015 | Lockhart | G06F 17/212 |
| 2009/0100093 | A1 * | 4/2009 | Makipaa | 707/104.1 |
| 2012/0210203 | A1 * | 8/2012 | Kandekar | G06F 17/241 715/230 |
| 2013/0282749 | A1 * | 10/2013 | Batraski | G06F 17/30864 707/767 |

* cited by examiner

*Primary Examiner* — Michelle Owyang
(74) *Attorney, Agent, or Firm* — Lee & Hayes, PLLC

(57) ABSTRACT

Techniques are described for identifying potentially interesting portions of a content item to be provided as a preview of the content item for prospective purchasers, based on previously collected data associated with the content item. Portions of a content item may be identified as potentially interesting based on a number of annotations (e.g., highlights, bookmarks, notes, and shares) previously made by viewers of a digital version of the content item. Potentially interesting portions may also include portions which prior viewers spent more time viewing, portions related to identified interests of the potential buyer, portions that are identified as separable for particular categories of content, and/or portions that have been previously identified as associated with elements of the content such as character, plot, and/or keywords.

24 Claims, 11 Drawing Sheets

PREVIEWING CONTENT BASED ON DETECTED CUSTOMER ACTIVITIES

BACKGROUND

Customers browsing in brick-and-mortar bookstores have traditionally enjoyed thumbing through a print book, reading its back cover, looking at illustrations, and so forth before deciding whether to purchase the book. As more and more book sales are happening via the Internet, online booksellers have sought to simulate this traditional browsing activity in a digital format. In particular, online booksellers often provide one or more pages of a book as a free preview to enable customers to browse through a book before deciding to purchase it. However, current previews may fail to provide a useful sampling of the book to a potential buyer.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
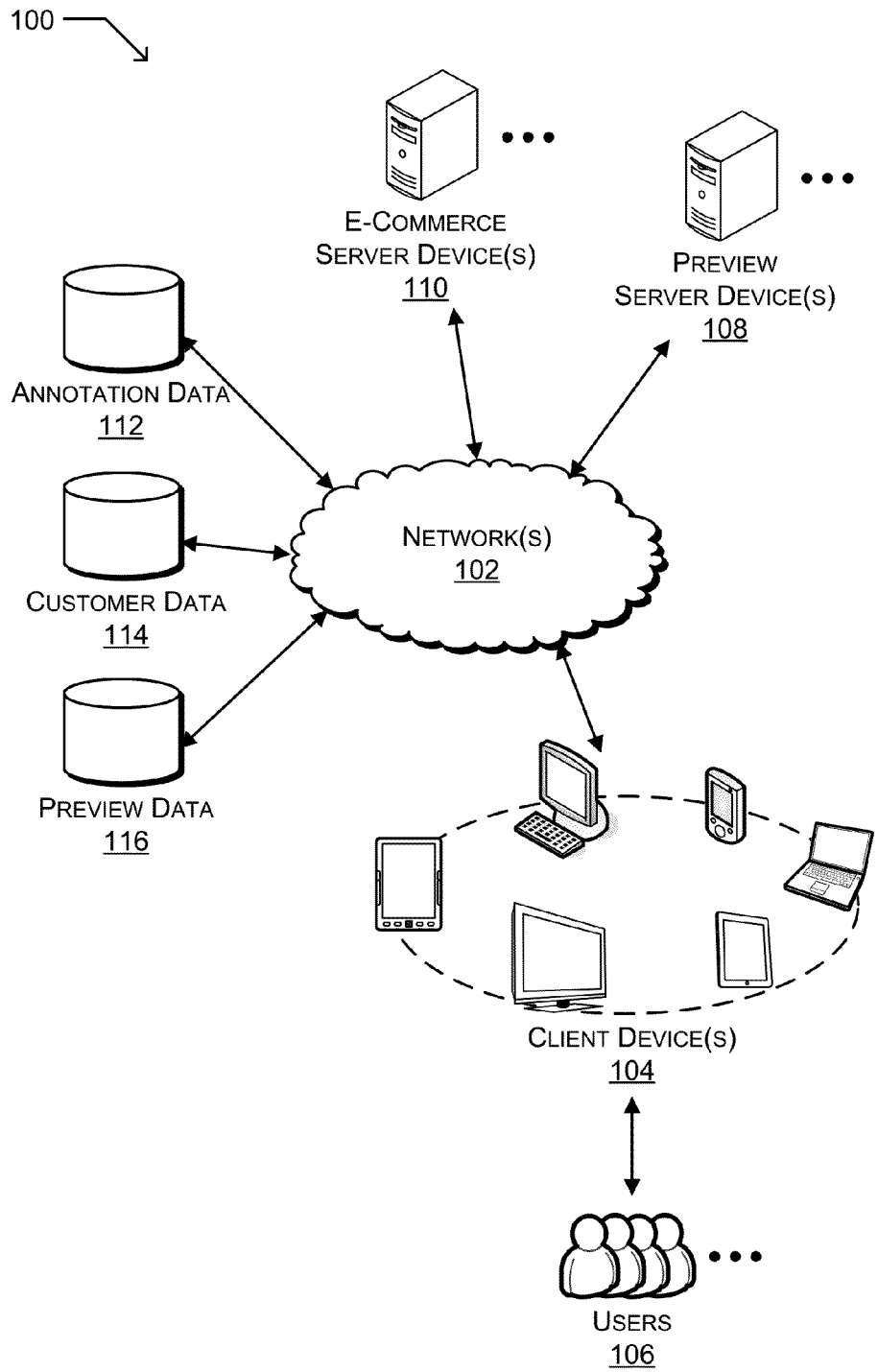
FIG. 1 depicts a diagram of an example environment in which embodiments may operate.

Embodiments are described for providing a preview portion of an item of digital content (e.g., an electronic book or eBook) based on detected activities of the potential customer or of previous customers. In various embodiments, a preview is provided that includes one or more portions of the content item that are predicted as being potentially interesting to a customer based on various techniques. Embodiments support previews provided in a digital format (e.g., through a web site) for customers purchasing print books online, as well as previews provided on a mobile computing device (e.g., an eBook reader) for customers purchasing eBooks or other content to be delivered and/or consumed in a digital format. Moreover, although various examples herein describe embodiments associated with previews of books, embodiments are not limited to books. Embodiments may provide previews for content items that include any type of digital publication, including but not limited to digital versions of books, magazines, pamphlets, articles, textbooks, journals, newspapers, zines, and so forth. Moreover, embodiments may also provide previews for other types of products or services that may be consumed by a user including but not limited to audio content, video content, games, graphics, images, multimedia content, and so forth.

In some embodiments, potentially interesting portions of a content item are predicted based on annotations made by previous users of a digital version of the content item. For example, users of an eBook may make digital annotations while reading the eBook. Such annotations may be stored locally on the eBook reader or other client computing device, and uploaded to a network storage device (e.g., periodically, and/or when the client device synchronizes with a network server). Embodiments may retrieve the stored annotation information for the content item, rank portions of the content item based the number of annotations made in various portions of an content item by previous users, and identify one or more top-ranked or highly ranked portions as potentially interesting portions to be provided as a preview.

In some embodiments, annotations may be weighted differently depending on historical data for activities of the users who made the annotations. For example, those users who browsed and/or purchased books in a particular genre, and/or posted comments or reviews online regarding books of a particular genre, may have their annotations weighted more heavily during the determination of the potentially interesting portions of a book in the particular genre.

In some embodiments, potentially interesting portions of a content item may be determined based on a category of the content and one or more separable portions of the content item associated with the category. For example, embodiments may determine that a content item is a recipe book, and may identify one or more separable portions as individual recipes included in the recipe book. In this way, a potential purchaser of the recipe book may be presented with an example recipe as a preview. In such cases, these separable portion(s) (e.g., recipes) may be partially redacted in the preview to prevent a user from extracting the entire recipe without purchasing the recipe book.

Moreover, in some embodiments identification of potentially interesting portions of a content item may be based on historical data regarding the activities of the potential buyer herself. For example, on receiving a request for a preview of a content item from a user, historical activity data associated with the user may be retrieved. In some cases, such historical activity data may include data regarding product or service purchases made by the user and/or data regarding products or services that the user has browsed or read about in the past. Embodiments may analyze the historical data to determine one or more interests of the user, and identify potentially interesting portions of the content item based on the determined interests. For example, if historical data indicates that a user has recently purchased products or services related to (or that the user has traveled to) Japan, potentially interesting portions of the content item may be identified as those portions which discuss or otherwise relate to Japan in some way.

Further, in some embodiments potentially interesting portions of a digital content item may be identified based on data collected regarding the actions of other users using the item. For example, data may be collected regarding the reading habits of users of a particular eBook, such as how much time users spend on particular pages, sections, chapter, or other portions of the book. In such cases, those portions of the book where users tend to spend more time reading may be identified as potentially interesting portions to include in a preview of the book. In some embodiments, a category or type of the content may be used to determine whether to determine the preview portion based on reading habits. For example, users reading a horror novel may tend to spend less time overall reading various portions of the book, so data related to reading patterns may be less useful for determining potentially interesting portions of a horror novel.

Some embodiments may employ previously identified and stored information regarding particular elements of a content item when determining potentially interesting portions of the content item. For example, portions of a book may be previously identified as discussing characters, locations, story elements, plotlines, concepts, keywords, and/or other elements of a book. In such cases, one or more of such previously identified portions (e.g., regarding a main character of a novel) may be provided as potentially interesting portions of the book for preview.

In some embodiments, one or more portions of the content item previously identified as uninteresting or otherwise unsuitable for preview may be omitted from the potentially interesting portions. For example, embodiments may omit blank pages, index pages, table of contents, glossary, copyright pages, acknowledgement pages, about-the-author pages, and/or other pages that are identified as uninteresting or less interesting, and not include such pages in the preview. Moreover, some embodiments may identify pages as uninteresting if those pages include less than a threshold amount of text or other content.

Some embodiments may provide, with the preview or separately, a capability (e.g., through a user interface element) for potential purchasers to provide feedback regarding whether a preview was useful, not useful, or to some degree partially useful. In such cases, the feedback may be used to modify the identification of potentially interesting portions of a content item to include in subsequent previews to future potential buyers. Embodiments are described in further detail with reference to the figures.

Illustrative Environment

FIG. 1 shows an example environment 100 in which embodiments may operate. In embodiments, the various devices and/or components of environment 100 may communicate with one another and with external devices via one or more networks 102. For example, networks 102 may include public networks such as the Internet, private networks such as an institutional and/or personal intranet, or some combination of private and public networks. Networks 102 may also include any type of wired and/or wireless network, including but not limited to local area networks (LANs), wide area networks (WANs), Wi-Fi, WiMax, and mobile communications networks (e.g. 3G, 4G, and so forth). Networks 102 may utilize communications protocols, including packet-based and/or datagram-based protocols such as internet protocol (IP), transmission control protocol (TCP), user datagram protocol (UDP), or other types of protocols. Moreover, networks 102 may also include a number of devices that facilitate network communications and/or form a hardware basis for the networks, such as switches, routers, gateways, access points, firewalls, base stations, repeaters, backbone devices, and the like.

In some embodiments, environment 100 includes one or more client device(s) 104 that are owned by, operated by, and/or otherwise associated with users 106. Client device(s) 104 may include any type of computing device that is able to communicate with other devices over network(s) 102, including but not limited to desktop computers, personal computers, laptop computers, tablet computers, eBook readers, wearable computers, mobile phones, automotive computers, thin clients, terminals, personal data assistants (PDAs), game consoles, mobile gaming devices, and the like.

In some embodiments, environment 100 includes one or more server computing devices such as preview server device(s) 108 and e-commerce server device(s) 110. Such server devices may include any type of computing device including, but not limited to, network servers, workstations, desktop computers, laptop computers, tablet computers, mobile computing devices, and the like. Further, the preview server device(s) 108 and/or e-commerce server device(s) 110 may include one or more computing devices that operate in a cluster or other grouped configuration to share resources, balance load, increase performance, provide fail-over support or redundancy, or for other purposes. In some embodiments, preview server device(s) 108 and/or e-commerce server device(s) 110 include one or more hardware components and/or one or more software components (e.g., processes and/or applications) to perform content submission evaluation tasks as described herein.

For example, preview server device(s) 108 may receive an indication that a potential customer (e.g., one of users 106) is requesting a preview of a content item such as a book, while browsing for products to purchase on a web site hosted by e-commerce server device(s) 110. Preview server device(s) 108 may provide a preview of the content to be shown in response to the request. The preview may be displayed to the potential customer through the e-commerce web site, provided for download to a client device such as client device(s) 104, or through other means. Preview server device(s) 108 may identify one or more potentially interesting portions of the content item to provide as the preview, according to embodiments described herein. Although preview server device(s) 108 and e-commerce server device(s) 110 are depicted as separate entities in FIG. 1, in some embodiments one or more functions of preview server device(s) 108 and/or e-commerce server device(s) 110 may be combined or co-hosted by a single computing device or collection of computing devices, and/or distributed among various devices.

As shown in FIG. 1, environment 100 may also include one or more data storage devices, databases, and/or data warehouses to store data associated with operations of preview server device(s) 108 and/or e-commerce server device(s) 110, or other elements of environment 100. For example, annotation data 112 may store data related to annotations made by users 106 while reading content items on client device(s) 104. Customer data 114 may store historical data for user browsing, purchasing, or other activities, and may store data associated with the reading habits purchasers of content. Preview server device(s) 108 may access annotation data 112 and/or customer data 114 to identify potentially interesting portions of a content item to provide as a preview, according to embodiments described herein, and may store previews determined for various content items in preview data 116.

Embodiments support data storage of various technology types, including but not limited to Oracle® databases in Oracle® Real Application Clusters (RACs), databases based Apache® Hadoop, Teradata®, and/or ParAccel® technologies, MySQL®, and/or other types of databases. Moreover, embodiments support tables of various data structures, including but not limited to relational databases, hierarchical databases, networked databases, hash tables, linked lists, flat files, and/or unstructured data.

Illustrative Computing System Architecture

Figure 2:
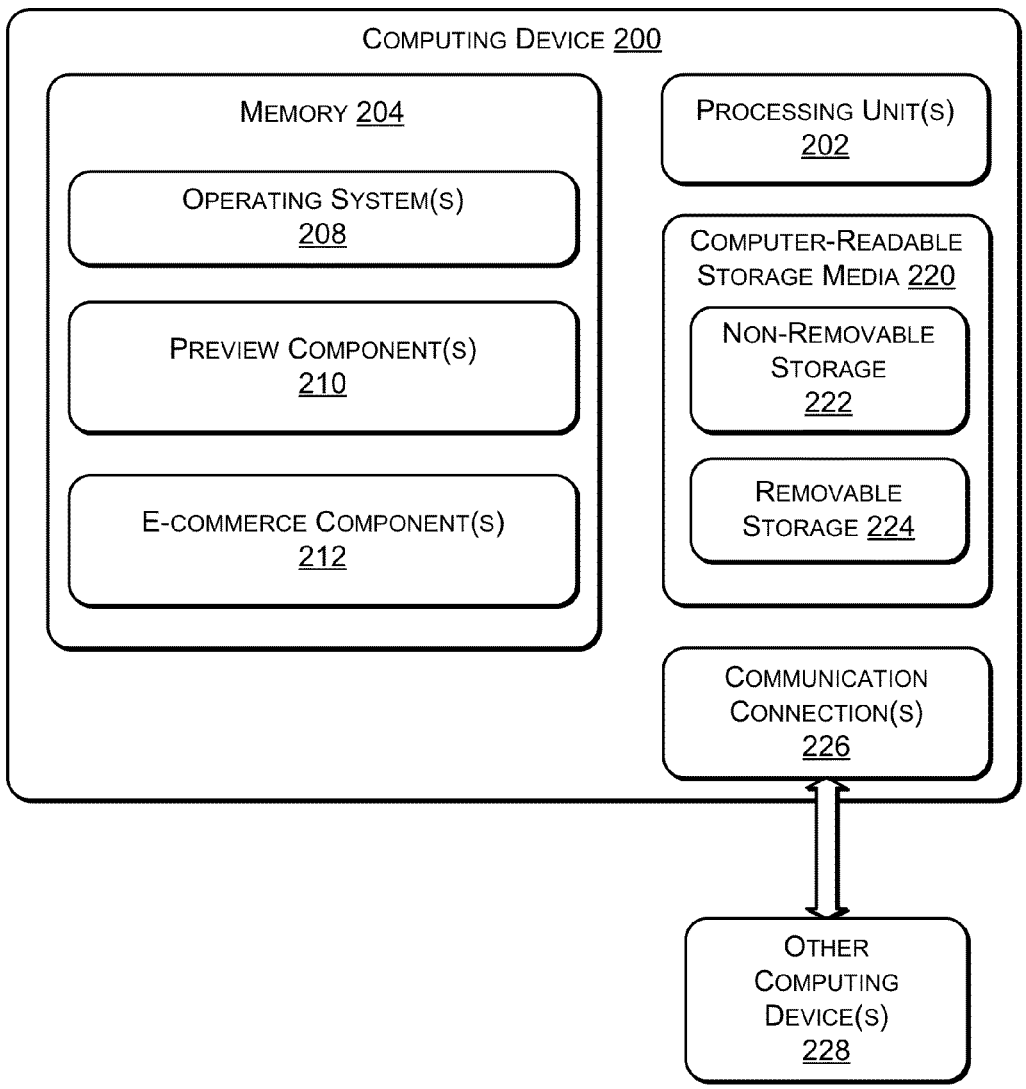
FIG. 2 depicts a diagram of an example architecture for a computing device, in accordance with embodiments.

FIG. 2 depicts an example computing device 200 that may be used to implement various embodiments described herein. For example, computing device 200 may provide an example system architecture for preview server device(s) 108 and/or e-commerce server device(s) 110 shown in FIG. 1, or other devices. In some embodiments, computing device 200 includes one or more processing units 202. Processing unit(s) 202 may include multiple processing units, and may be implemented as hardware, software, or some combination thereof. Processing unit(s) 202 may include one or more processors. Processing unit(s) 202 may also include computer-executable, processor-executable, and/or machine-executable instructions written in any suitable programming language to perform various functions described herein.

As shown, computing device 200 includes a memory 204, which is an example of computer-readable media, and which may include volatile memory such as random access memory (RAM), static random access memory (SRAM), dynamic random access memory (DRAM), cache memory, and the like. In some embodiments, memory 204 includes one or more executing operating systems (OS) 208, and one or more executing processes including components, programs, or applications that are loadable and executable by processing unit(s) 202. Such processes may include preview component(s) 210 to identify potentially interesting portion(s) of a content item to provide as a preview according to embodiments described herein. Moreover, memory 204 may also include e-commerce component(s) 212 to provide a platform for an online e-commerce web site.

Memory 204 may also include non-volatile memory such as read only memory (ROM), flash memory, and the like. Moreover, memory 204 may also include cache memory, active memory, and/or physical memory used by the various processes that run based on instructions and data stored within memory 204. Thus, although various components are depicted as executing from memory 204, such components may reside in and/or execute from, at least in part, storage (e.g., on a hard drive or other mass storage) through use of virtual memory, swap pages, and the like.

As shown in FIG. 2, computing device 200 may also include computer-readable storage media 220, which is also a form of computer-readable media, and which may include non-removable storage 222 (e.g., a hard drive) and/or removable storage 224 including magnetic disk storage, optical disk storage, tape storage, storage arrays, storage area networks, network attached storage, cloud storage, and the like. Disk drives and associated computer-readable media may provide non-volatile storage of computer readable instructions, data structures, program modules, and other data for the operation of computing device 200.

As used herein, computer-readable media includes two distinct types of media: storage media and communications media. With regard to storage media, embodiments may be provided as a computer program product stored on a non-transitory computer-readable or machine-readable storage medium. Computer-readable or machine-readable storage media (e.g., computer-readable storage media 220) includes tangible and/or non-transitory forms of media such as volatile and/or non-volatile memory. Such media may be included in a device and/or hardware component that is part of a device or external to a device, including but not limited to random-access memory (RAM), SRAM, DRAM, read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, or any other non-transmission memory, device, and/or medium that can be used to store and maintain information for access by a computing device. Computer storage media may store information in the form of instruction sets, data structures, applications, program modules and the like, that may be used to program a computing device or processor and thus enable a computing device or processor to perform actions. The stored information may be stored in a compressed or uncompressed form.

In contrast to the tangible storage media described above, communication media is non-tangible (e.g., transitory) and may include data (e.g., computer instruction sets, data structures, program modules, and the like) transmitted in a modulated data signal such as a carrier wave. Embodiments may also be provided as a computer program product including a transitory machine-readable signal (in compressed or uncompressed form). Examples of machine-readable signals, whether modulated using a carrier or not, include but are not limited to signals that a computer system or machine hosting or running a computer program can be configured to access, including signals downloaded through the Internet or other networks. For example, distribution of software may be via Internet download. Thus, tangible computer storage media does not include non-tangible communication media.

Although not depicted in FIG. 2, computing device 200 may further include one or more input devices to receive user input (e.g., a keyboard, a mouse, a pen, a game controller, a voice input device, a touch input device, gestural input device, and the like), and/or one or more output devices (e.g., a display, a printer, audio speakers, a haptic output, and the like). Computing device 200 may further include communications connection(s) 226 that allow computing device 200 to communicate with other computing devices 228 including client devices, server devices, databases, and/or other networked devices available over one or more communication networks. Computing device 200 may also include one or more busses and/or other internal communications hardware or software that allow for the transfer of data and/or internal communications between the various components of computing device 200.

Illustrative Client Device

Figure 3A:
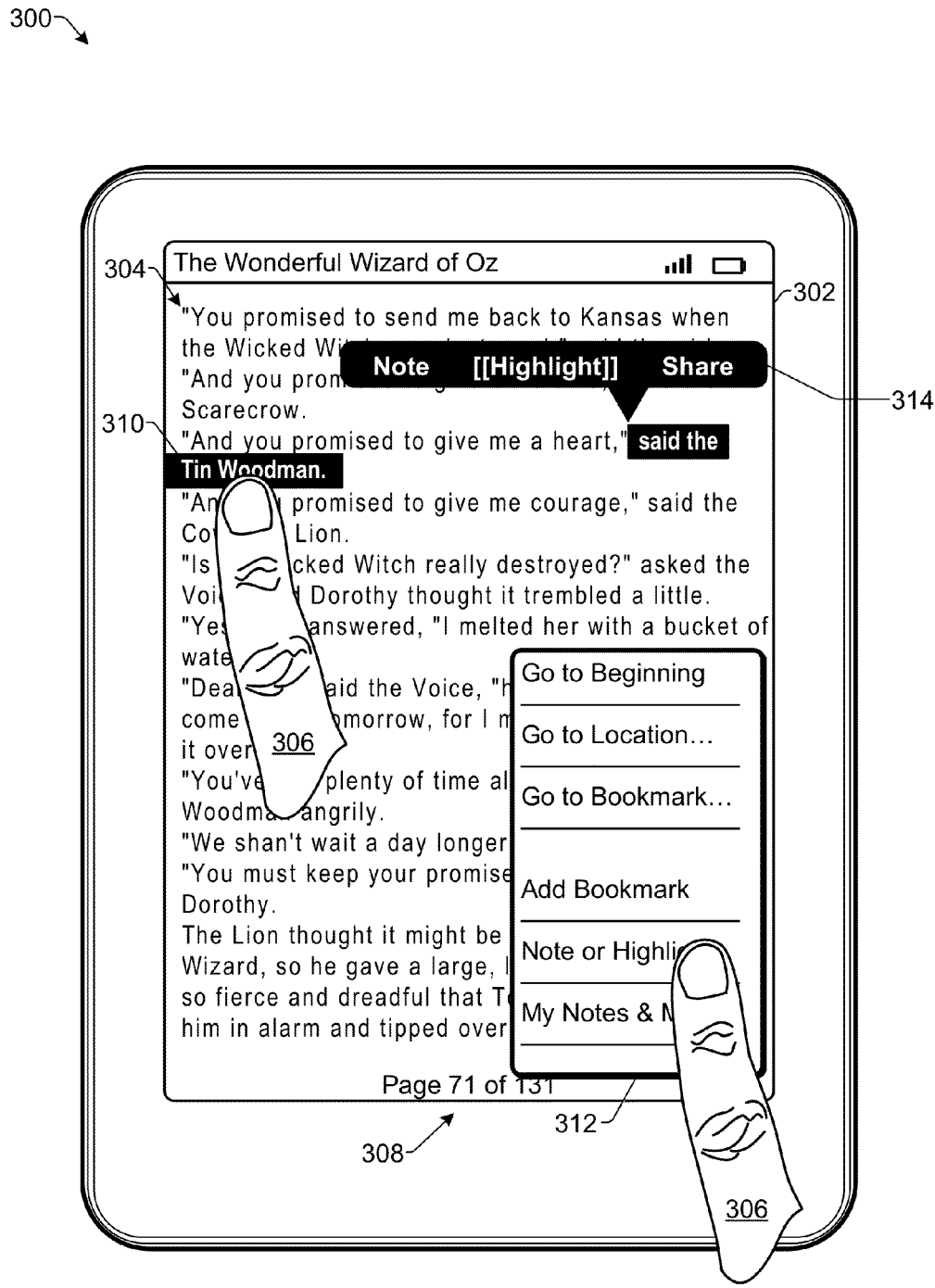
FIGS. 3A-3C illustrate an example device providing access to content and example user annotations, in accordance with embodiments.
Figure 3B:
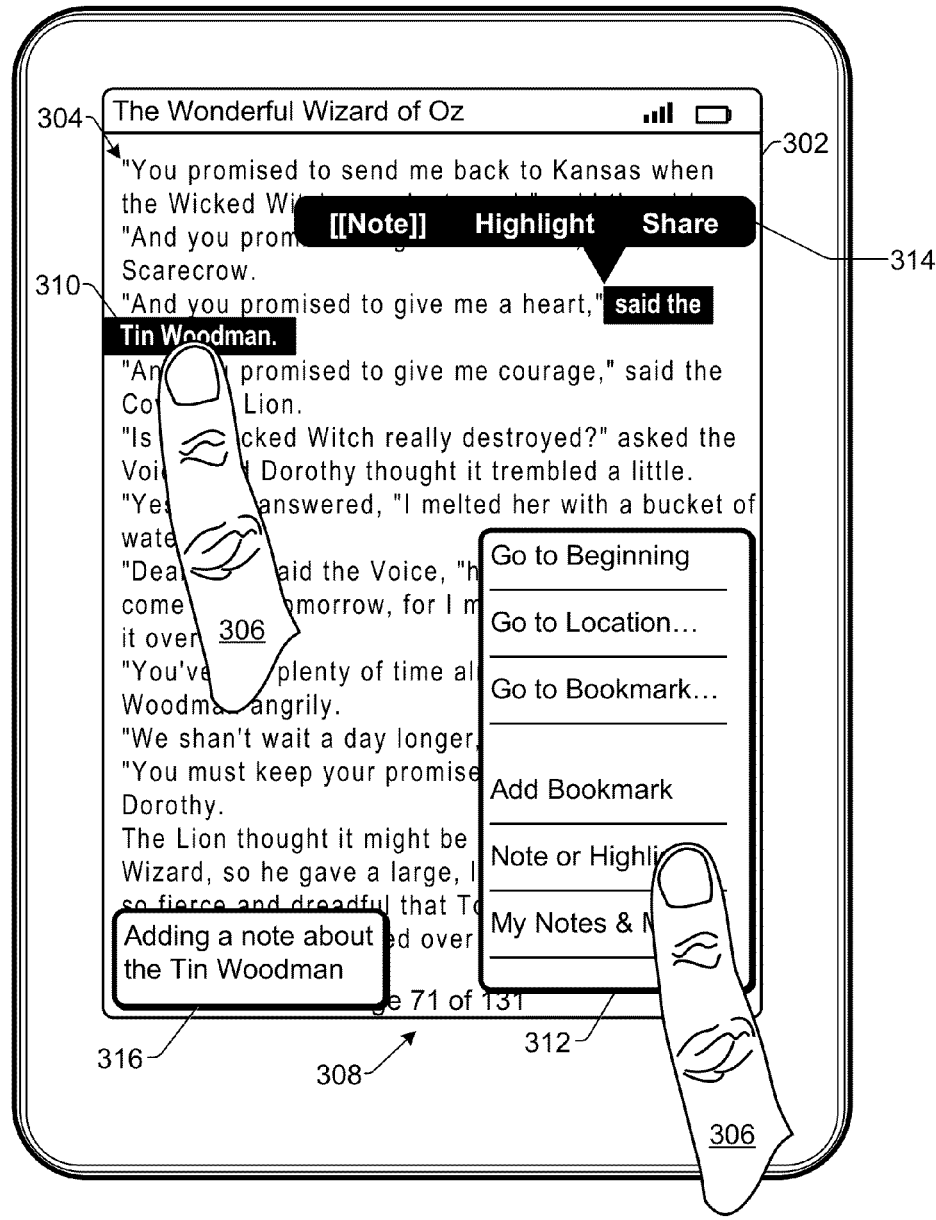
Figure 3C:
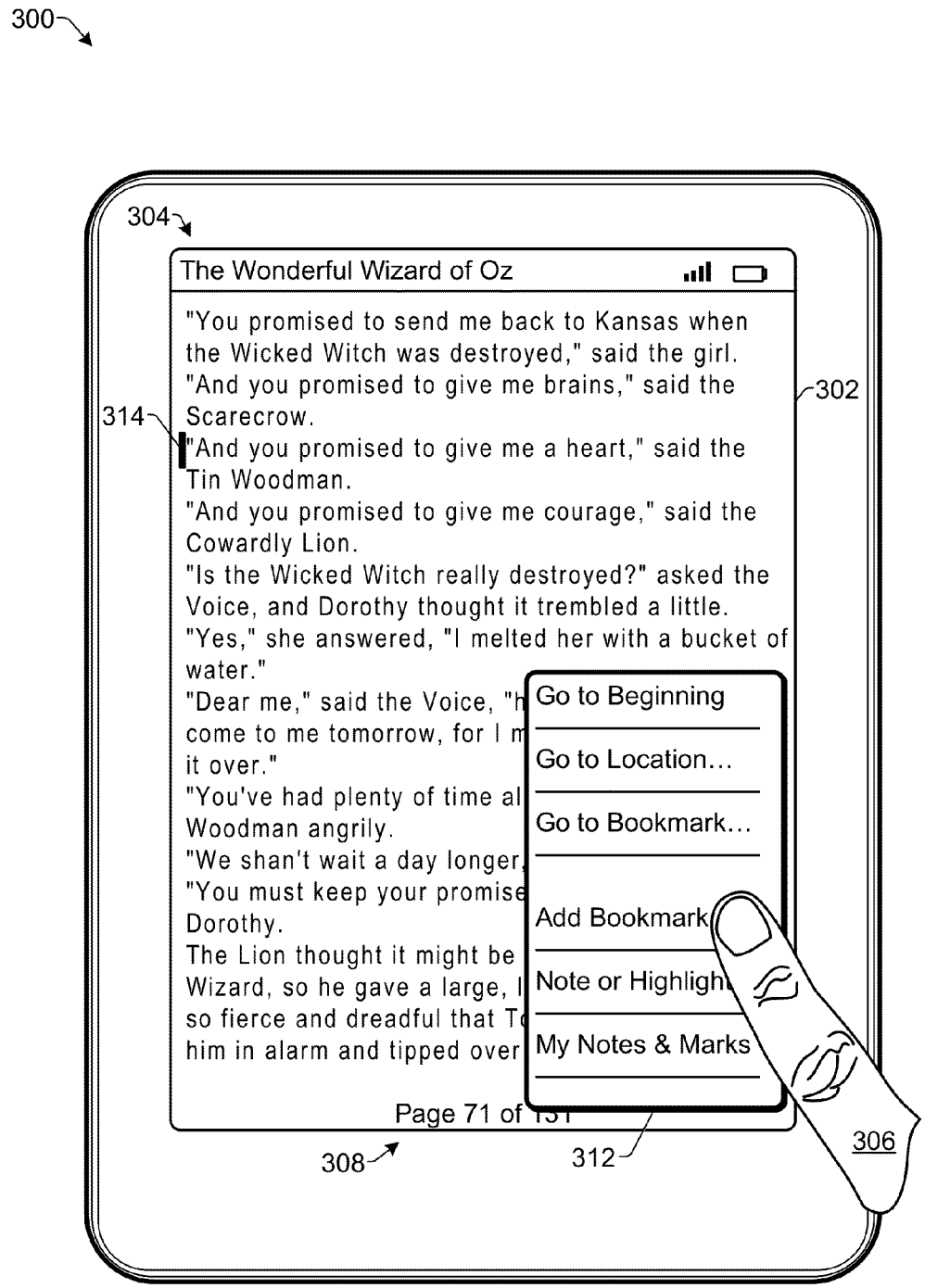

FIGS. 3A-3C illustrate an example electronic device 300 that provides access to provide access to digital content, according to embodiments. As described further below, some embodiments identify potentially interesting portions of a content item based on annotations made by users while reading the content item in a digital format such as an eBook. FIGS. 3A-3C depict examples of the types of annotations that may be thus employed. The electronic device 300 may be implemented as any of a number of electronic devices, such as an eBook reader, a media player, a tablet computing device, a smart phone, a portable gaming device, a PDA, a laptop or netbook computer, a wearable computer, an automotive computer, and so forth. Furthermore, the electronic device 300 may not necessarily be a mobile or portable device, and thus, in some implementations may include a display of a desktop or other computing device, a gaming system, a television, other home electronics devices, a thin client, a computing terminal, and so forth.

As shown in FIGS. 3A-3C, the electronic device 300 includes a display 302 for displaying content such as a digital content item 304, other image or interface to a user. In some examples, the display 302 may be a touchscreen type of display configured with a sensor to sense a touch input received from an input effecter 306, such as a finger of a user, a stylus, or other pointer. Thus, the touchscreen may receive one or more touch inputs, interactions, commands, selections of displayed objects, and so forth. In the examples shown, display 302 further indicates a current page number 308 of the digital content item 304.

In other implementations, the display may be non-touch sensitive. Accordingly, in addition to, or as an alternative to, a touch sensitive display, the electronic device 300 may include various external controls and input devices. For example, some implementations (not shown in FIGS. 3A-3C) of the electronic device 300 may include a virtual or physical keyboard, a mouse, a pointing stick, a touchpad, a trackball, a joystick, a remote control, buttons, gestural tracking inputs, and/or various other controls for performing various desired inputs and interactions with the electronic device 300 and digital content item 304 displayed on the display 302, and which may include selection of one or more portions, sections, words, sentences, paragraphs, images, or objects in the digital works. Additionally, in other implementations, one or more voice commands may be used to control or interact with the interfaces herein, such as for selection and performing other functions. Thus, implementations herein are not limited to any type of input devices, techniques, or controls.

In some implementations, the digital content item 304 may be an electronic publication (e.g., an eBook) having one or more pages of text. For example, the display 302 may depict the text of the electronic publication and also any illustrations, tables, maps, or graphic elements that might be contained in the publication. The terms book, manuscript, publication, and/or eBook, as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth. Accordingly, the terms book, manuscript, publication, and/or eBook may include any readable or viewable textual content that is in electronic or digital form. Additionally, embodiments herein are not limited to digital text, and embodiments may identify and provide previews for various other types of content including but not limited to audio content (e.g., music, audible books, etc.), video content (e.g., movies, television, short clips, etc.), images (e.g., art, photographs, etc.), games, and/or multi-media content.

FIG. 3A depicts an example of a user highlighting text in a digital content item 304. In the illustrated example of FIG. 3A, a user is shown reading digital content item 304, e.g. a portion of "The Wonderful Wizard of Oz" by L. Frank Baum. In the example shown, the user has highlighted a section of text 310 using input effecter 306 (e.g., a finger), and opened a contextual menu 312 showing options for handling the highlighted text 310. As shown, the user has also selected a particular menu item of contextual menu 312, the "Note or Highlight" menu item. In the example shown, selection of the "Note or Highlight" menu item causes display of a second contextual menu 314 providing options such as "Note", "Highlight", and "Share." The user selects "Highlight" to highlight the selected section of text 310. In some embodiments, highlighting of text includes providing a distinguishing shading and/or color for the text and/or its surrounding area to distinguish the highlighted text from other non-highlighted text. Once the highlight command has been entered by the user, data for the highlighted section of text may be stored in memory on electronic device 300 so that the highlight is displayed when the user subsequently reopens digital content item 304.

FIG. 3B depicts an example of a user adding a note into a digital content item 304. In the example shown, the user has selected a section of text 310 using input effecter 306, and opened contextual menu 312. The user has also selected the "Note or Highlight" menu item from contextual menu 312 to open a second contextual menu 314. The user has then selected the "Note" option from the second contextual menu 314. In this example, selection of the "Note" option has caused the display of a text input 316 into which the user may enter text for the note to be added at the location indicated by selected text 310. Once the note has been entered by the user, data for the note (e.g., location of the note, text of the note, date/time when it was added by the user, which user added the note, and so forth) may be stored in memory on electronic device 300 so that the note is displayed when the user subsequently reopens digital content item 304. Moreover, as shown contextual menu 312 may include a menu item "My Notes & Marks" allowing the user to view a list of annotations previously added to the digital content item 304.

In the example shown, selection of the "Note or Highlight" menu item in contextual menu 312 may further enable a user to share the selected text 310 through a "Share" option in the second contextual menu 314. For example, the user may select the "Share" option to share the selected text 310 and additional comments to a social networking site, blog, short message sharing service (e.g., Twitter®) or other web site or service. The "Share" option may also enable the user to send the selected text 310 and additional comments to other online users via e-mail, text message, short message service (SMS) message, multimedia messaging service (MMS) message, or other communication.

FIG. 3C depicts an example of a user adding a bookmark into a digital content item 304. In the example shown, the user has selected a location 314 in the digital content item 304 using input effecter 306, and opened contextual menu 312. The user has then selected an "Add Bookmark" menu item of contextual menu 312 to add a bookmark at location 314. Once the bookmark has been added, data for the bookmark (e.g., its location, date/time when it was added by the user, which user added it, and so forth) may be stored in memory on electronic device 300 so that the bookmark is displayed when the user subsequently reopens digital content item 304. Moreover, as shown, contextual menu 312 may include a menu item "My Notes & Marks" allowing the user to view a list of annotations previously added to the digital content item 304, and/or a menu item "Go to Bookmark . . ." to allow the user to navigate to a selected bookmark in digital content item 304.

FIGS. 3A-3C illustrate a user entering various types of annotations such as a bookmark, a note, highlights, and/or shares in a digital content item 304. However, embodiments are not limited to these examples of annotations, and other types of annotations may be supported by embodiments. After the annotations are added by the user and stored to local memory on the reader device 304, data for the annotations may subsequently be uploaded to a network server device such as preview server device(s) 108 and/or e-commerce server device(s) 110, and/or stored in a database such as annotation data 112. In embodiments, this upload may occur during a synchronization of the device with the network server device. Such synchronization may be performed periodically (e.g., daily), when the user gives a command to shutdown the device, and/or when the user manually requests that the locally stored data be synchronized with a network server device, or at another time.

Illustrative Process and Interfaces

FIGS. 4 and 5A-5E depict flowcharts showing an example process in accordance with various embodiments. The operations of this process are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described process.

Figure 4:
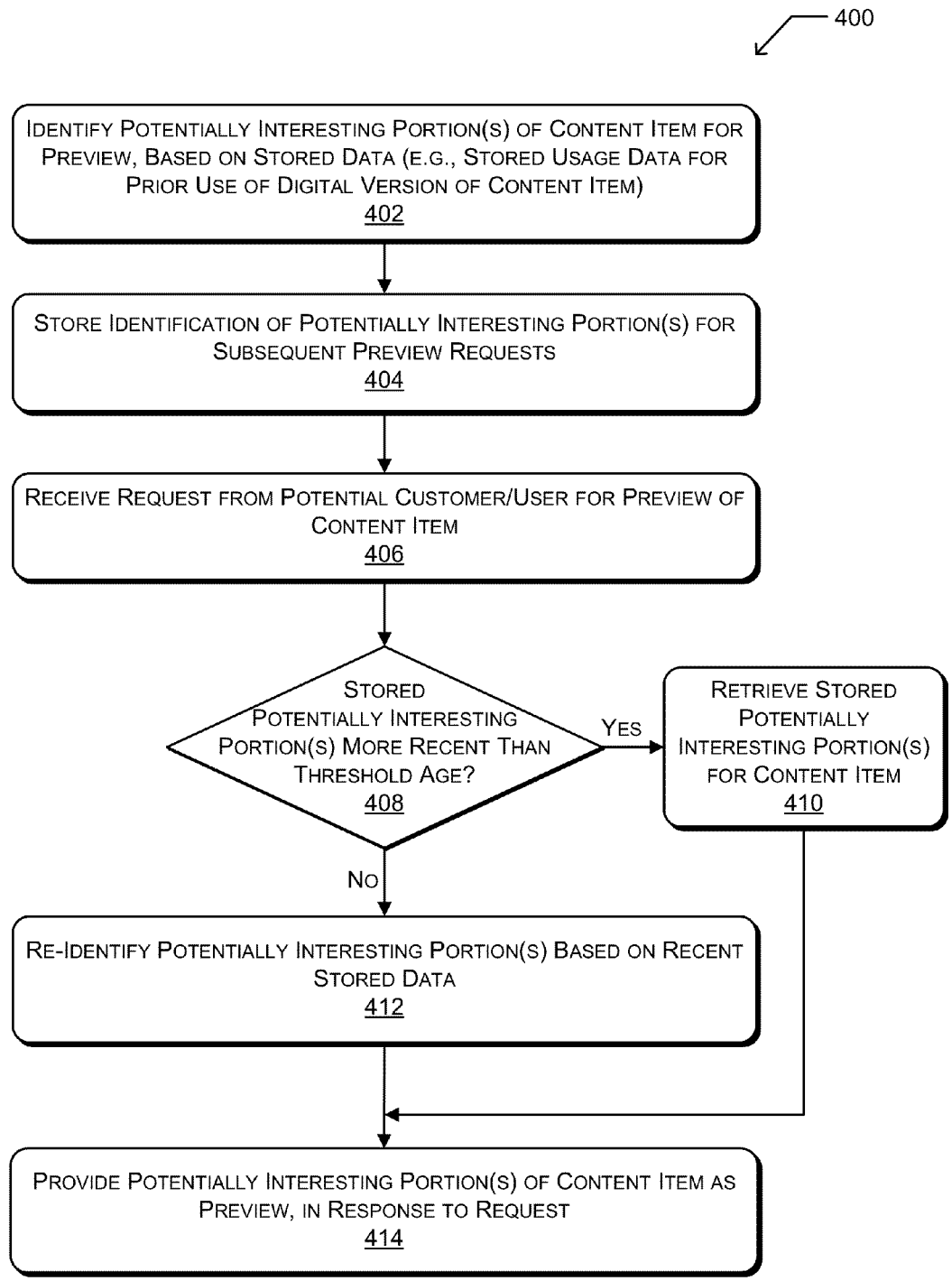
FIG. 4 depicts a flow diagram of an illustrative process for providing a preview that includes predicted interesting portions of content, in accordance with embodiments.

FIG. 4 depicts a flow diagram of an illustrative process 400 for providing a preview of a content item to a potential purchaser or user of the content item. In some embodiments process 400 may be executed by preview server device(s) 108 to provide a preview of a content item to users 106 of client device(s) 104. At 402, one or more potentially interesting portions of a content item are identified, based on stored data associated with the content item and/or associated with users of the content item. In some embodiments, the stored usage data includes information gathered regarding the prior use of a digital version of the content items by previous users and/or previous purchasers of the content item. In some embodiments, the stored user data may include annotation data 112 and/or customer data 114. Embodiments for determining potentially interesting portion(s) of a content item are described further with regard to FIGS. 5A-5E.

At 404, information identifying the potentially interesting portion(s) may be stored (e.g., in preview data 116) to be used when providing future previews for the content item. At 406, a request for a preview of the content item is received from a potential customer or potential user of the content item. In some embodiments, the request may be received from user browsing an e-commerce web site and deciding which products to purchase. For example, while browsing book(s) on the e-commerce web site the user may request a preview of at least a portion of a book prior to deciding whether to purchase the book in a physical format (e.g., a print book), a digital or electronic format (e.g., an eBook), an audio book format, or other format.

At 408, a determination is made whether the identification of the potentially interesting portions is more recent than a certain threshold age (e.g., more recent than a month). If so, then at 410 the potentially interesting portion(s) of the content item are retrieved from data storage. If not, then at 412 a re-identification of potentially interesting portion(s) may be performed based on more recent or up-to-date stored usage data. Thus, embodiments may operate to periodically update the identified potentially interesting portions of a content item based on the ongoing collection of usage data for that content item.

At 414, the potentially interesting portion(s) are provided as a preview to the user, in response to the user's request for a preview of the content item. In some embodiments, the preview is provided within the e-commerce website. In some embodiments, the preview may be transmitted or otherwise provided for the user to view on a mobile computing device such as an eBook reader.

FIGS. 5A-5E depict a flow diagram of an illustrative process 500 for identifying one or more potentially interesting portions of a content item to provide as a preview of the content item, according to embodiments. In some embodiments process 500 may be executed by preview server device(s) 108 to provide a preview of a content item to users 106 of client device(s) 104. FIGS. 5A-5E depict various techniques that embodiments may employ in any combination to identify potentially interesting portions of the content item. These techniques include identifying potentially interesting portion(s) based on:

- Annotations (e.g., notes, bookmarks, highlights, and/or shares) made in a digital version of the content item by previous users of the content item;
- A determined category of the content item, and identification of one or more separable portions of the content item associated with the category (e.g., recipes in a recipe book);
- Determined interest(s) of the potential purchaser of the content item, based on historical data for online activities of the potential purchaser (e.g., past purchases, browsing history, participation in online discussions, posts to web pages, and so forth);
- Historical data describing the reading patterns of other users of the content item, such as how much time various users spent while reading particular pages, chapters, or portions of the content item; and
- Previously identified and stored elements of the content item, including but not limited to characters, plots, locations, concepts, keywords, or other elements of the content item.

Figure 5A:
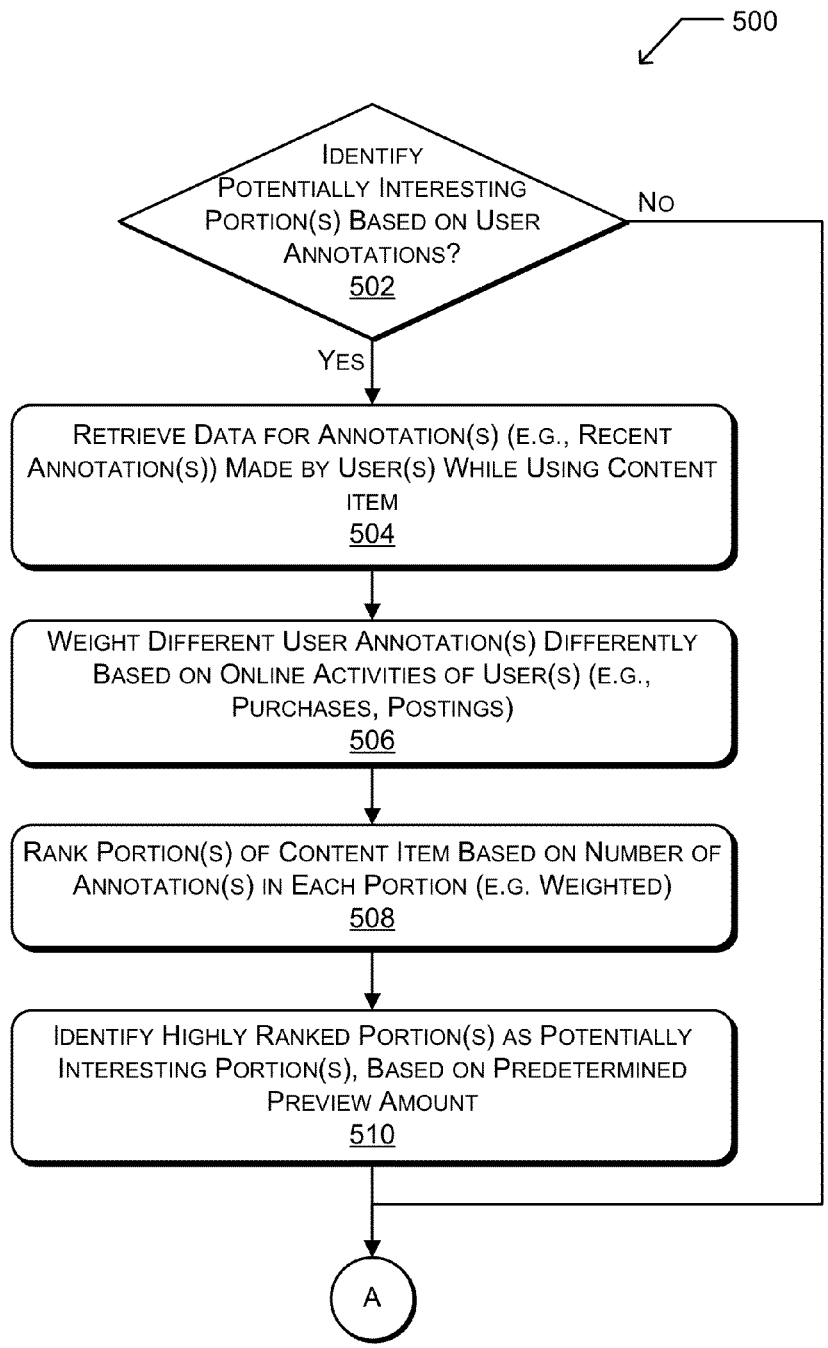
FIGS. 5A-5E depict flow diagrams of illustrative processes for predicting interesting portions of content to provide as a preview, in accordance with embodiments.

As shown in FIG. 5A, at 502 a determination is made whether potentially interesting portion(s) of a content item are to be determined based on previous user annotations made while viewing a digital version of the content item. If so, then at 504 data is retrieved including information for previously made annotations. In some embodiments, annotation data is retrieved from a database or other data storage (e.g., annotation data 112. Annotations may include bookmarks, notes, highlights, and/or sharing of selected sections of the content item as shown in FIGS. 3A-3C, or other types of annotations made by users. The annotation data retrieved may further include information for which user made the annotation, when it was made (e.g., date and time), and other information. In some embodiments, recent annotation data (e.g., data more recent than a certain threshold age, such as younger than a month) may be used to identify potentially interesting portion(s).

At 506, in some embodiments, annotations of various users may be weighted differently based on detected online activities or other data for the various users. Such online activities may include data stored in customer data 114, including but not limited to data for past purchases of products and/or services, past online browsing of products and/or services, online participation in discussion groups (e.g., group blogs, product/service reviews, media reviews), postings on social network sites and/or blogs, and so forth. Moreover, in some embodiments other data may be used to weight annotations, such as demographic data, geographic location data, or other data associated with the users who made the annotations.

By weighting annotations according to user data, embodiments may weight annotations more heavily if those annotations were made by users whose interests or characteristics are more relevant to the content item. For example, those users who browsed and/or purchased books in a science fiction genre, and/or posted comments or reviews online regarding books, films, and/or television in that genre, may have their annotations weighted more heavily during the determination of the potentially interesting portions of a book in the science fiction genre.

At 508 portions of the content item are ranked based on a number of annotations previously made in each portion of the content item by previous purchasers or users of the content item. In embodiments that employ the weighting described with regard to 506, the count of annotations may be weighted according to stored information about the user who made the annotation, as described above. Embodiments may determine portions in various ways, and a portion of a content item may be a page, a multi-page section, and/or a chapter of the content item. In some embodiments, division of a content item into portion may be based on a particular category of the content item. For example, novels may be divided into chapters whereas technical manual may be divided into sections distinguished by particular technological concepts. The portions of a content item may then be ranked based on the number of annotations previously made in each portion by users viewing a digital version of the content item.

At 510, one or more highly ranked portions of the content item are identified as the potentially interesting portion(s) to be provided as a preview to potential purchasers. In some embodiments, the particular number of highly ranked portions may be based on a predetermined preview size or amount of the content item. For example, embodiments may provide a predetermined maximum percentage (e.g., 5%) of the content item for a preview, such that the number of highly ranked portions identified as potentially interesting are those whose total size is less than or equal to 5% of the size of the content item. Further, in some embodiments, determination of potentially interesting portions may be based on identifying those portions in which a predetermined minimum number of users have made at least one annotation or a predetermined minimum number of annotations.

Moreover, in some embodiments those portions of the content item that are not identified at 510 may be cached, saved, or otherwise stored in memory to provide to potential purchasers who indicate that they would like to view additional preview portions of the content item beyond those identified as potentially interesting. In such embodiments, when the potential purchaser is viewing the initially provided preview portion (e.g., on a web site or on a computing device), a user interface element may be displayed to enable the user to request additional preview portions. In some embodiments, such additional preview portions may be queued according to their rankings, and provided to the user in ranked order. For example, the potential purchaser may be initially shown a preview that includes the highest ranked five portions of the content item, and on requesting additional preview portions the potential purchaser may be shown the sixth, seventh, and eighth ranked portions, and so on.

Figure 5B:
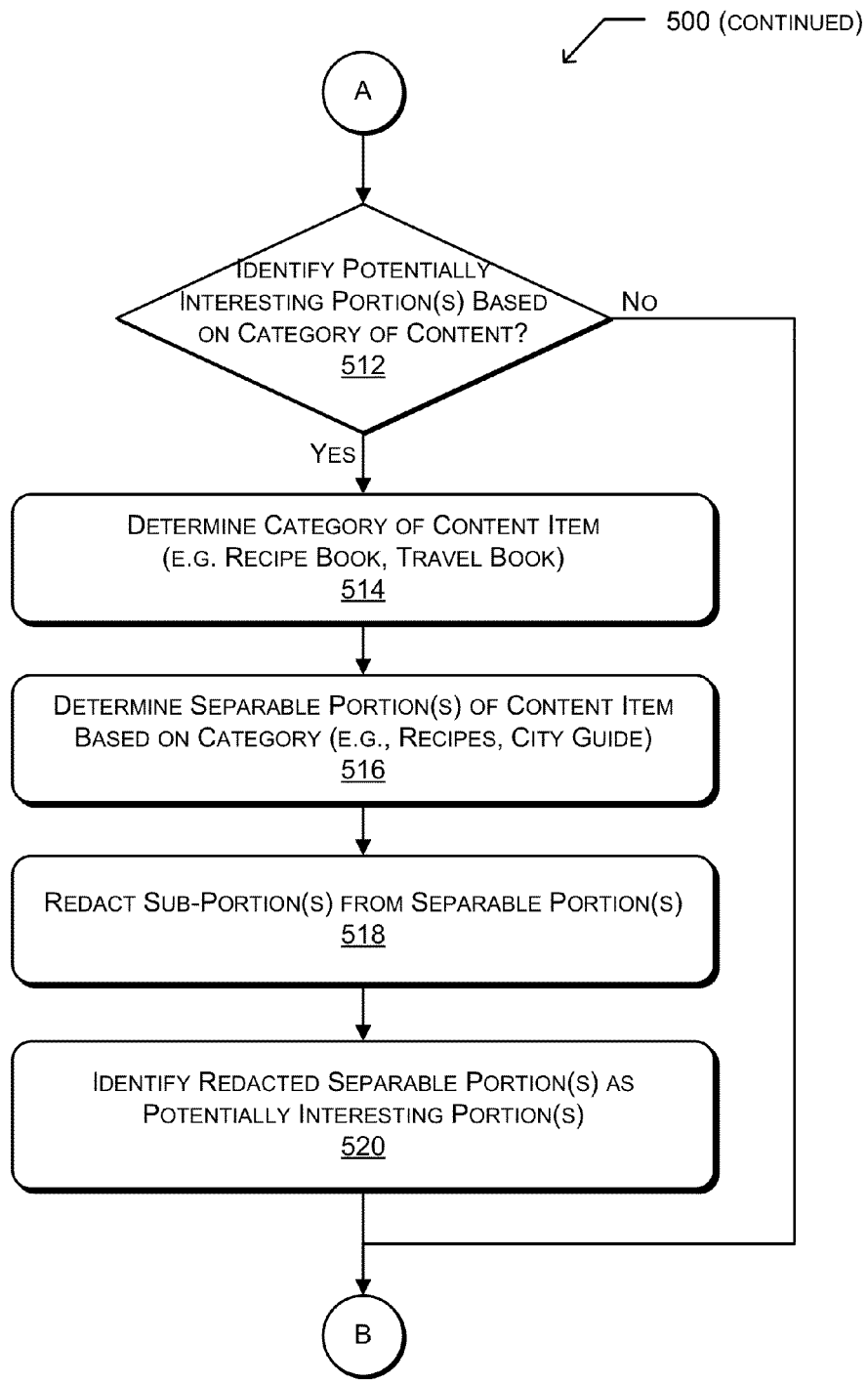

As shown in FIG. 5B, at 512 a determination is made whether potentially interesting portion(s) of the content item are to be identified based on a category of the content in the content item, and an identification of separable portions of the content item associated with the category. If the determination is positive, then at 514 the category of the content item is determined. In some embodiments, determination of the category may be based on metadata or other information associated with the content item that identifies the content item as having a particular type or genre. In some embodiments, determination of the category may be based on a textual analysis of the content item to look for particular keywords or phrases in its text.

At 514 a determination may also be made whether the category of the content item is one for which separable, stand-alone portions may be identified for the content item. Examples of categories amenable to separable portion identification include recipe books with separable recipes, travel books with separable sections for different locations, technical manuals with separable sections for particular technologies or procedures, short story or essay collections with separable sections for separate stories or essay, or other categories. If the category is a type amenable to separable portion identification, at 516 the separable portions of the content item are determined based on the particular category of the content item.

At 518, in some embodiments, one or more sub-portions of the separable portions may be redacted prior to further processing. Embodiments may perform such a redaction to prevent user from free-riding or otherwise benefiting by extracting the separable content (e.g., a particular recipe) from the preview and not purchasing the content item. At 520 the separable portions (e.g., redacted in some embodiments) are identified as the potentially interesting portions of the content item to be provided as a preview.

Figure 5C:
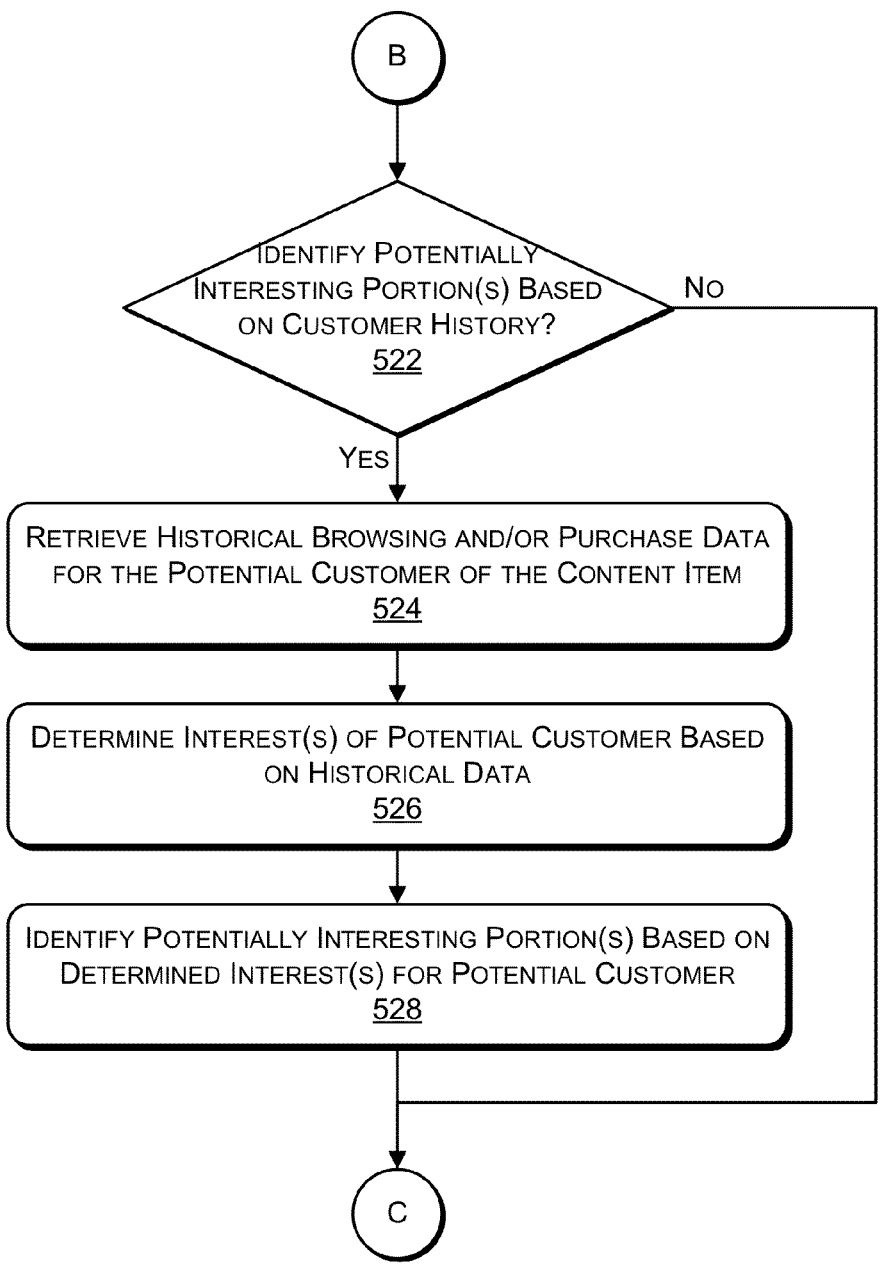

As shown in FIG. 5C, at 522 a determination is made whether to identify potentially interesting portion(s) based on historical user data and other profile data for the potential customer requesting the preview of the content item. If so, at 524 historical data associated with the potential customer is retrieved from data storage (e.g., customer data 114). In some embodiments, the retrieved historical data may include data for past purchases of products and/or services made by the potential customer, data for previous browsing activity or online viewing of products and/or services made by the potential customer, demographic data, location data, and/or other data. In some embodiments, such data may be included as profile data in an online user profile for the potential customer. In addition to historical usage data, profile data may also include preference settings established by the user to assist the user in located products and services for which they are most interested.

At 526, based on the retrieved data, one or more interests of the potential customer are determined. For example, for a potential customer who has purchased products or services associated with France, an inference may be made that the potential customer is interested in France or in various things or people that are French. In some embodiments, the inference of interests may be based on recent data for the potential customer (e.g., data stored and/or updated within the last month or last year), to attempt to identify interests that are current for the potential customer. At 528, one or more potentially interesting portions of the content item are determined based on the inferred interests for the potential customer. For example, if an inference is made that the potential customer is interested in France, those portions of the content item related to France may be identified as potentially interesting to the customer.

Figure 5D:
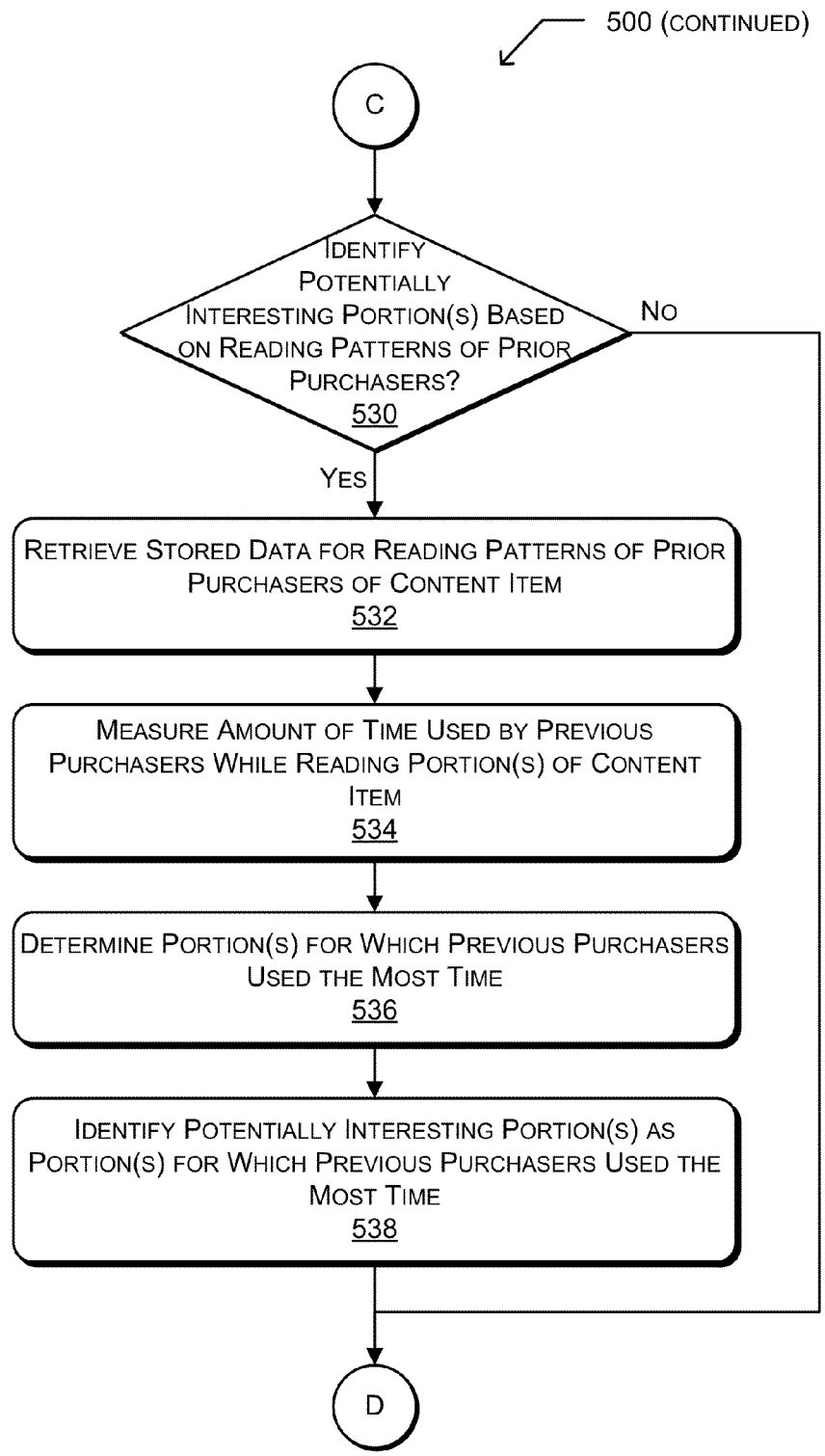

As shown in FIG. 5D, at 530 a determination is made whether to identify potentially interesting portion(s) of the content item based on usage patterns (e.g., reading patterns) of prior purchasers of the content item. In some cases, when a user is viewing a digital version of a content item on a device (e.g., an eBook reader), the device may capture and store information regarding an amount of time spent by the user viewing each page, chapter, or other portion of the content item. This data may be uploaded to a network server device and stored in a database (e.g. customer data 114). At 532, this stored data for reading patterns of prior purchasers of the content item is retrieved.

At 534, an amount of time is determined for one or more portions of the content item, the amount of time associated with the measured amount of time spent by previous purchasers while viewing the one or more portions. In some embodiments, the amount of time for each portion may be an average over all of the previous purchasers which read the portion. At 536 those portions are determined which previous purchasers spent the most viewing. In some embodiments, this may include a ranking of the portions ordered based on the average viewing time. At 538, one or more portions are identified as potentially interesting portions, based on those portions which previous purchasers spent the most time viewing.

In some embodiments, the use of a stored reading pattern or other usage data to determine a preview portion may be more relevant for certain genres or categories of content item than for others. For example, readers may in general spend less time reading exciting or suspenseful sections of horror novels, and therefore using this technique to determine preview portions for horror novels may produce erroneous results.

Figure 5E:
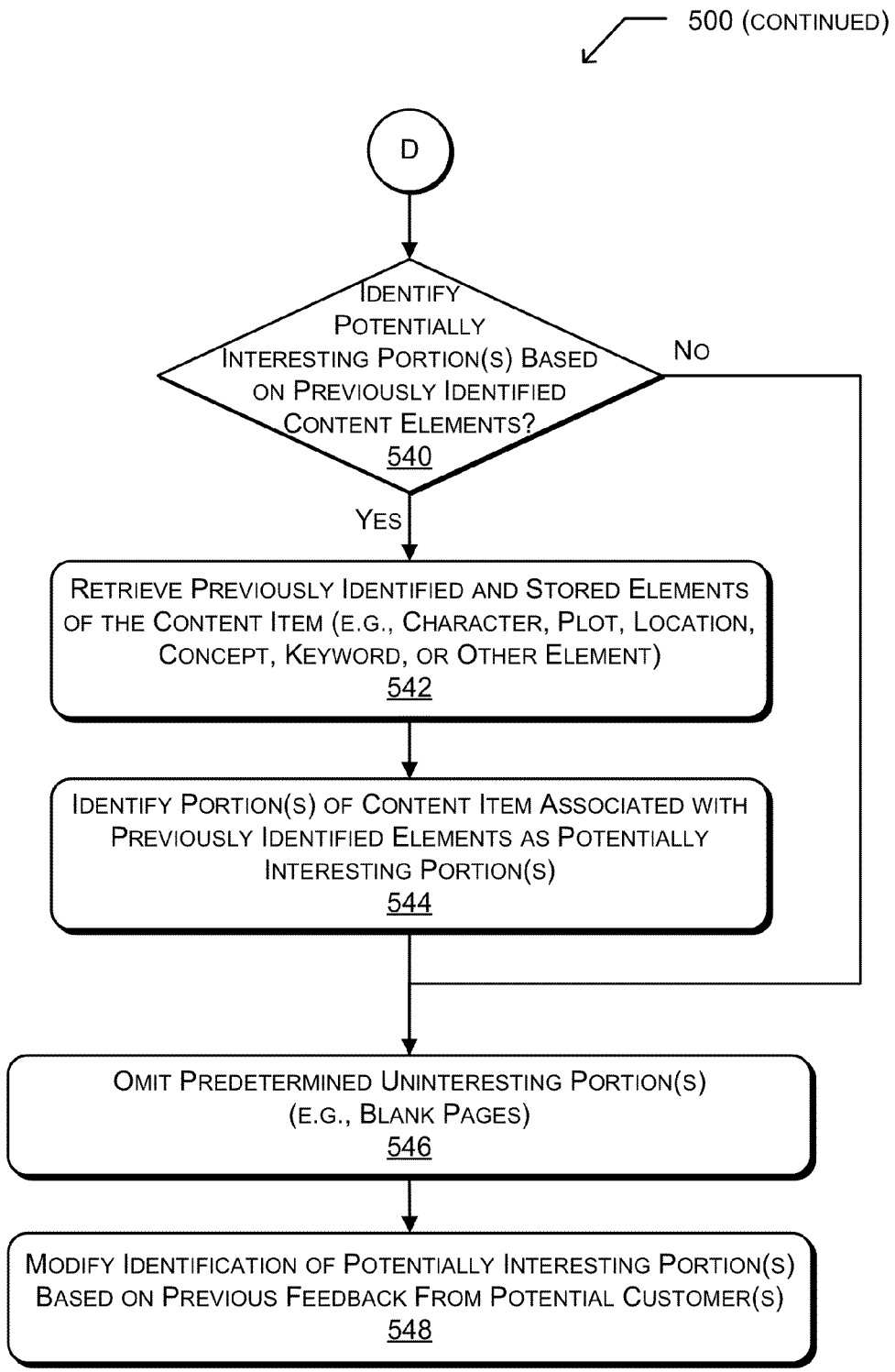

As shown in FIG. 5E, at 540 a determination may be made whether to identify potentially interesting portion(s) based on previously identified content elements of the content item. In some cases, previous analysis of a content item (e.g., a book) may have been performed manually or automatically to identify certain elements of the content item including but not limited to plot elements, characters, locations, concepts, keywords, or other elements. In some embodiments, such analysis may have been performed to provide a useful in-book guide to such elements for the reader while reading the content item on his/her eBook reader. In the course of such an analysis, portions of the content item may have been identified as associated with the identified elements and stored in a database.

At 542 the previously identified elements of the content item are retrieved, and at 544 one or more such portions are identified as potentially interesting portion(s) to be provided as a preview. For example, embodiments may provide a previously identified section of a novel related to an interesting character or plotline as a preview to entice a potential purchaser into buying the book.

In some embodiments, after the potentially interesting portion(s) of the content item have been identified (e.g., using one or more of the techniques described above), one or more additional processing steps may be performed prior to providing the identified portions as a preview to the potential customer.

For example, at 546 one or more portions that having been predetermined as uninteresting may be omitted from the preview portions. Such predetermined uninteresting portions may include blank pages, index pages, table of contents pages, glossary pages, copyright pages, acknowledgement pages, about-the-author pages, and/or other pages that are identified as uninteresting or less interesting, and not include such pages in the preview. Moreover, some embodiments may identify pages as uninteresting if those pages include less than a threshold amount of text or other content.

Further, at 548 the identification of potentially interesting portion(s) may be modified based on previously received feedback from potential customers viewing those portions as a preview. In some embodiments, when a potential customer is presented with a preview of the content item, the potential customer may also be presented with an opportunity to evaluate how useful that preview has been to them in making their purchase decision. In some embodiments, the feedback may be binary (e.g., useful or not useful). In other embodiments, the feedback may be presented as a ranking along a numeric range (e.g., rank from 1 to 5 in increasing helpfulness). In such cases, the feedback data collected may be stored and used to refine or otherwise modify those portions of a content item included in a preview of the content item.

Moreover, in some embodiments, determination of potentially interesting portions may be dynamically updated periodically (e.g., monthly) based on more recent user data received. For example, data may be received regarding recent user annotations made in the content item, and process 500 may periodically execute to update potentially interesting portions to provide as a preview of the content item. In some cases, for a period of time after a content item is made available for users, there may not be enough user data to predict potentially interesting portions. In such cases, a default portion may be provided as a preview. For example, the default portion may include a predetermined amount from the beginning of the content item (e.g., a first five percent), or a predetermined amount from a point in the content item where a user is likely to start reading (e.g., a first five percent from the beginning of the first chapter).

CONCLUSION

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method comprising:
   receiving, from at least one client device associated with at least one user of a content item, one or more annotations related to a content item;
   ranking portions of the content item based, at least in part, on a number of the one or more annotations that relate to a respective portion;
   selecting a ranked portion of the content item based at least in part on determining that a number of pages of the ranked portion does not exceed a predetermined preview amount of the content item; and
   sending content of the selected portion as a preview of the content item.

2. The method of claim 1, wherein the content item is a digital content item, and wherein the one or more annotations include one or more of a highlight, a bookmark, a note, or an indication that the digital content item was shared by at least one user of the digital content item.

3. The method of claim 1, wherein the predetermined preview amount is a predetermined percentage of the content item.

4. The method of claim 1, wherein the ranking of the portions of the content item is further based on at least one characteristic of the at least one user of the content item.

5. The method of claim 4, wherein the at least one characteristic includes at least one of a previous purchase or a previous online activity of the at least one user.

6. The method of claim 1, wherein the ranking of the portions of the content item is further based on usage data associated with a potential purchaser of the content item.

7. The method of claim 1, wherein at least one additional ranked portion of the content item is stored and provided based on an indication that a potential purchaser of the content item requests an additional preview of the content item.

8. A computer-implemented method comprising:
   weighting annotations associated with a digital version of a content item based, at least in part, on one or more online activities of a plurality of users;
   ranking one or more preview portions of the content item based, at least in part, on the weighted annotations;
   selecting at least one ranked preview portion from among the one or more preview portions based, at least in part, on profile data associated with a potential user of the content item; and
   providing the at least one preview portion as a preview to the potential user of the content item.

9. The method of claim 8 wherein selecting at least one ranked preview portion includes:
   determining one or more ranked preview portions of the content item for which a size of the one or more ranked preview portions does not exceed a predetermined preview amount of the content item; and
   selecting the one or more ranked portions as the at least one preview portion.

10. The method of claim 8, wherein the selecting of the at least one ranked preview portion is further based on at least one of historical browsing data or historical purchase data for the potential user.

11. The method of claim 8, wherein the at least one ranked preview portion includes at least one portion associated with a previously identified element of the content item, and wherein the previously identified element is at least one of a character, a plot, a location, a concept, or a keyword in the content item.

12. The method of claim 8, wherein weighting the one or more annotations based, at least in part, on one or more online activities of the plurality of users comprises:
    determining an characteristic of a first user of the plurality of users based at least in part on the one or more online activities;
    determining an attribute of the content item;
    determining a relationship between the characteristic of the first user and the attribute of the content item; and
    weighting an annotation associated with the first user based at least in part on the relationship between the characteristic of the first user and the attribute of the content item.

13. The method of claim 8, wherein the one or more online activities include at least one of a purchase, a product review, or a posting to a discussion forum.

14. The method of claim 8, wherein the annotations include at least one of a highlight, a bookmark, a note, or an indication that the content item was shared by at least one user of the content item.

15. A system comprising:
    at least one processor; and
    a preview component executed by the at least one processor to:
        select one or more portions of a content item as one or more preview portions of the content item based, at least in part, on reading patterns associated with a digital version of the content item by a plurality of users;
        select at least one preview portion from among the one or more preview portions based on profile data associated with a potential user of the content item; and
        provide the at least one preview portion as a preview to the potential user of the content item.

16. The system of claim 15 wherein the preview component further operates to:
    receive feedback indicating whether the preview was useful to the potential user; and
    modify the at least one preview portion based, at least in part, on the received feedback.

17. The system of claim 15 wherein the content item includes at least one of the following: a book, a magazine, a journal, a newspaper, an article, a pamphlet, or a zine.

18. The system of claim 15 wherein the preview component further operates to:
    receive the reading patterns, which are associated with an estimated amount of time spent by the plurality of users consuming respective portions of the digital version of the content item;
    rank portions of the content item based, at least in part, on the estimated amount of time spent by the plurality of users consuming respective portions of the digital version of the content item; and
    identify one or more ranked portions of the content item as the at least one preview portion.

19. The system of claim 18 wherein the one or more ranked portions are identified based, at least in part, on a determination that a size of the one or more ranked portions does not exceed a predetermined preview amount of the content item.

20. The system of claim 15, wherein the reading patterns include an estimated amount of time spent by the plurality of users consuming respective portions of the digital version of the content item, and wherein the one or more preview portions of the content item include at least one portion for which the plurality of users spent the most time.

21. One or more non-transitory computer-readable storage media storing instructions that, when executed, instruct at least one processor to perform actions comprising:
    receiving, from a plurality of users, one or more annotations related to a digital content item;
    weighting the one or more annotations based, at least in part, on one or more online activities of the plurality of users;
    ranking portions of the digital content item based, at least in part, on the weighted annotations;
    identifying one or more ranked portions of the content item as a preview portion of the digital content item;
    providing the preview portion as a preview of the digital content item to a potential user of the digital content item.

22. The one or more non-transitory computer-readable storage media of claim 21, wherein the one or more online activities include at least one of a purchase, a product review, or a posting to a discussion forum.

23. The one or more non-transitory computer-readable storage media of claim 21, wherein weighting the one or more annotations based, at least in part, on one or more online activities of the plurality of users comprises:
    determining an characteristic of a first user of the plurality of users based at least in part on the one or more online activities;
    determining an attribute of the content item;
    determining a relationship between the characteristic of the first user and the attribute of the content item; and
    weighting an annotation associated with the first user based at least in part on the relationship between the characteristic of the first user and the attribute of the content item.

24. The one or more non-transitory computer-readable storage media of claim 21, wherein the one or more online activities include at least one of a purchase, a product review, or a posting to a discussion forum.

* * * * *